United States Patent [19]

Frenelle

[11] Patent Number: 5,351,647
[45] Date of Patent: Oct. 4, 1994

[54] AVIAN OR ANIMAL CAGE CROSS MEMBER
[75] Inventor: James R. Frenelle, Geneva, Ohio
[73] Assignee: Controls Unlimited, Inc., Perry, Ohio
[21] Appl. No.: 7,498
[22] Filed: Jan. 22, 1993
[51] Int. Cl.5 .......................................... A01K 31/12
[52] U.S. Cl. ...................................... 119/26; 446/105
[58] Field of Search .................... 119/21, 22, 24, 25, 119/26; 446/105, 107

[56] References Cited
U.S. PATENT DOCUMENTS

| | | | |
|---|---|---|---|
| 884,398 | 4/1908 | Lucas | 119/24 |
| 1,598,159 | 8/1926 | Skinner | 119/25 |
| 1,898,297 | 2/1933 | Fox | 446/105 X |
| 3,119,372 | 1/1964 | Gantz . | |
| 3,200,789 | 8/1965 | Danowitz | 119/26 |
| 3,398,719 | 8/1968 | Walker . | |
| 3,811,219 | 5/1974 | Fischer | 446/107 |
| 4,334,868 | 6/1982 | Levinrad | 446/105 X |

Primary Examiner—Thomas Price
Attorney, Agent, or Firm—Oldham, Oldham & Wilson Co.

[57] ABSTRACT

A cross member for use as an avian or animal perch or as a support member for additional cage accessories. The cross member comprises an elongated beam member removably attachable to opposing sides of an open wire or bar cage via corresponding open slots at opposing ends of the beam member and which are slightly offset from parallel to one another.

14 Claims, 3 Drawing Sheets

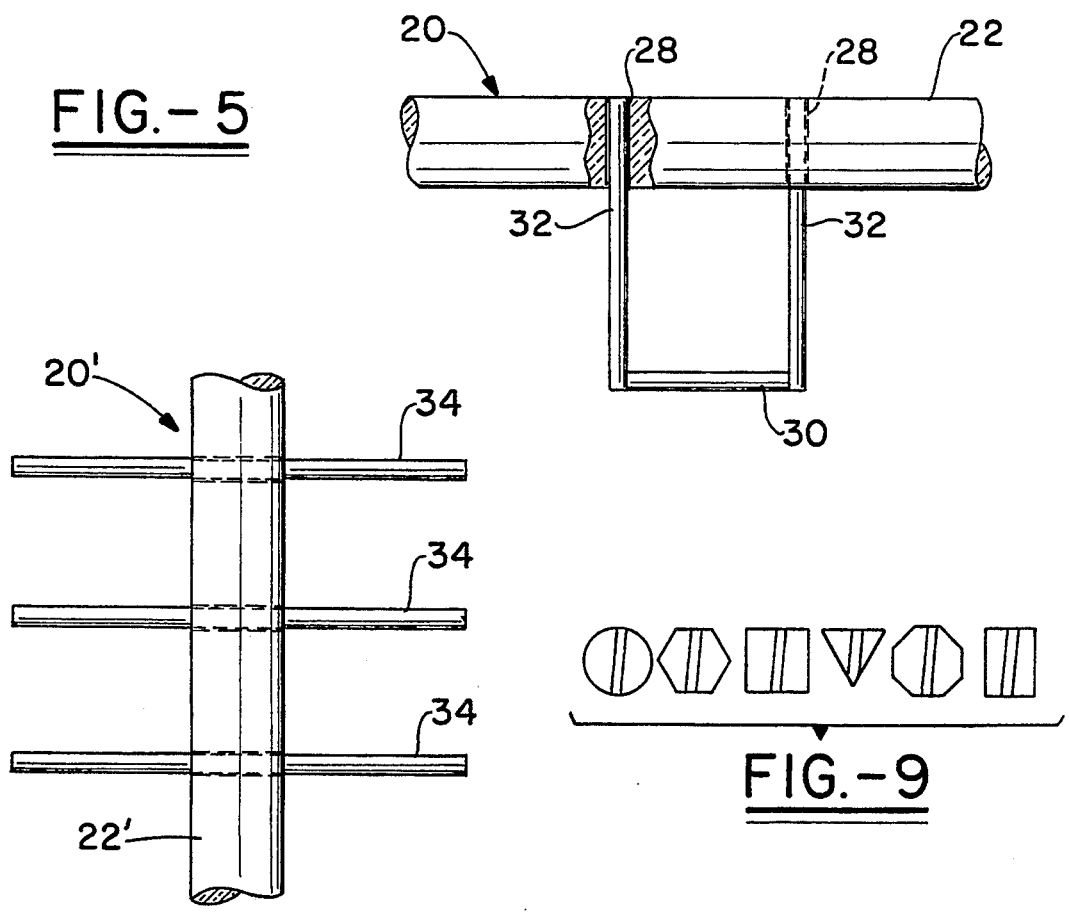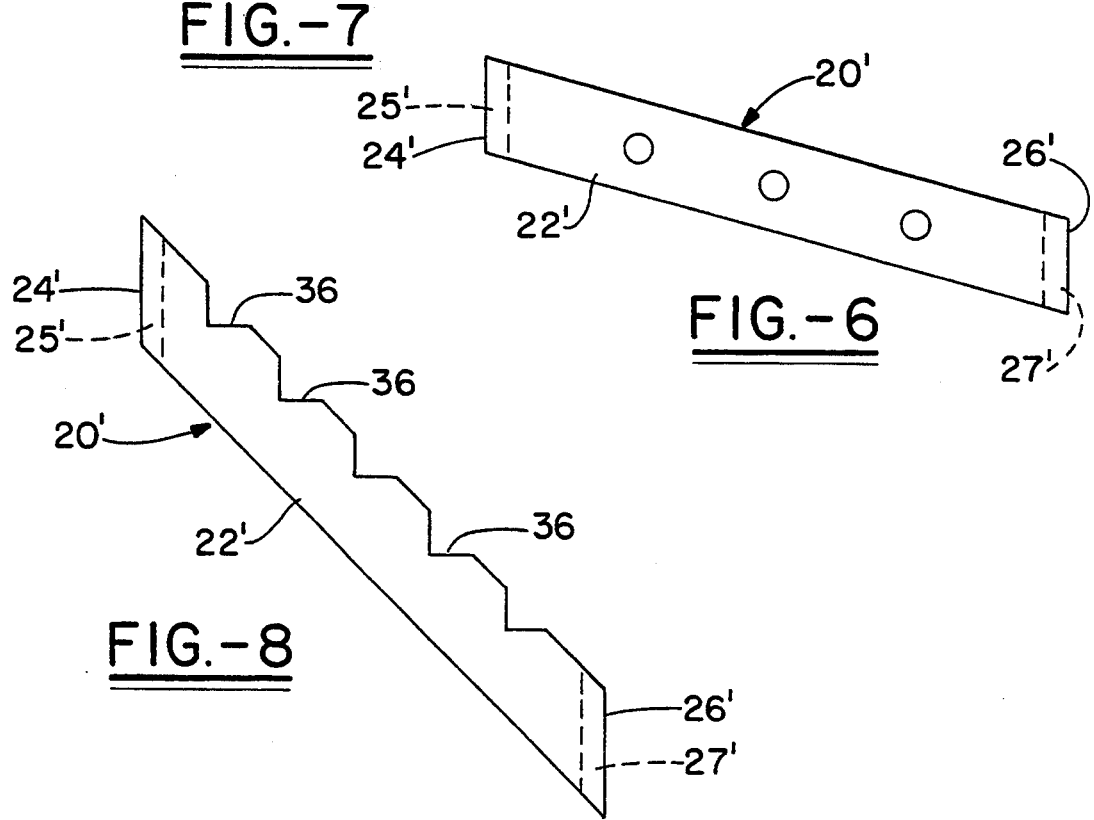

AVIAN OR ANIMAL CAGE CROSS MEMBER

TECHNICAL FIELD

The present invention generally relates to an elongated cross member removably attachable to opposite sides of an open wire or bar animal cage and requiring no independent attaching means. More specifically, the elongated cross member is intended as a bird or animal perch and/or a support for cage accessories.

BACKGROUND OF THE INVENTION

Many types of avian and animal perches and supports for use in open wire and bar type cages are known. However, to a large extent these perches and supports require numerous mounting brackets and the like for attachment to the cage and require access to the inside of the cage for installation. Additionally, many known perches and supports are made from materials which can be quickly and easily marred or destroyed by the pecking, chewing and/or clawing of the caged birds or animals.

Therefore, in view of the deficiencies present in the prior art, the following invention is herein presented.

SUMMARY OF THE INVENTION

The present invention is a cross member for use as an avian or animal perch or as a support member for additional cage accessories. In the preferred embodiment, the cross member comprises an elongated beam member removably attachable to opposing sides of an open wire or bar avian or animal cage having two (2) ends and at least one open slot at each end. The beam member is approximately equal in length to the distance between two opposing sides of the cage. Corresponding open slots at opposing ends of the beam member are slightly offset from parallel to one another. The beam member is installed, without the need of additional attachment means, by first introducing one or more vertical wires or bars from one side of the cage into an open slot at one end of the beam member and subsequently rotating the beam member in a direction so as to bring the corresponding open slot at the opposite end of the beam member into parallel with one or more wire or bars on the opposite side of the cage and, thereafter inserting the same into the open slot.

The cross member of the present invention is preferably composed of an acrylic or other material capable of resisting degradation from the pecking, chewing or clawing of the caged birds or animals. The present invention is capable of virtually instantaneous installation requiring no additional mounting materials or tools.

It is an object of the present invention to provide an improved avian or animal perch which is durable in construction and inexpensive to manufacture.

It is a further object of the present invention to provide an improved avian or animal perch removably attachable to opposite sides of an open wire or bar cage without requiring independent means for attachment.

It is a further object of at least one embodiment of the present invention to provide an improved avian or animal perch composed of material capable of degradation caused from the pecking, clawing or chewing of the caged birds or animals.

It is a further object of the present invention to provide an improved avian or animal perch which is capable of serving as a support member for the attachment of additional cage accessories.

These and other objects and advantages of the present invention will become more readily apparent from the more detailed discussion of the preferred embodiments, taken in conjunction with the drawings wherein similar elements are identified by like numeral through several views.

BRIEF DESCRIPTION OF THE DRAWINGS

FIG. 5 is a side elevational view of the principal embodiment of the present invention, and serving as a support member for additional cage accessories.

FIG. 6 is a side elevational view of an alternative embodiment of the present invention.

FIG. 7 is a top view of the embodiment of the present invention disclosed in FIG. 6.

FIG. 8 is a side elevational view of a further embodiment of the present invention.

FIG. 9 illustrates various geometries for alternative embodiments of the present invention.

DETAILED DESCRIPTION OF THE PREFERRED EMBODIMENTS

Figure 1:
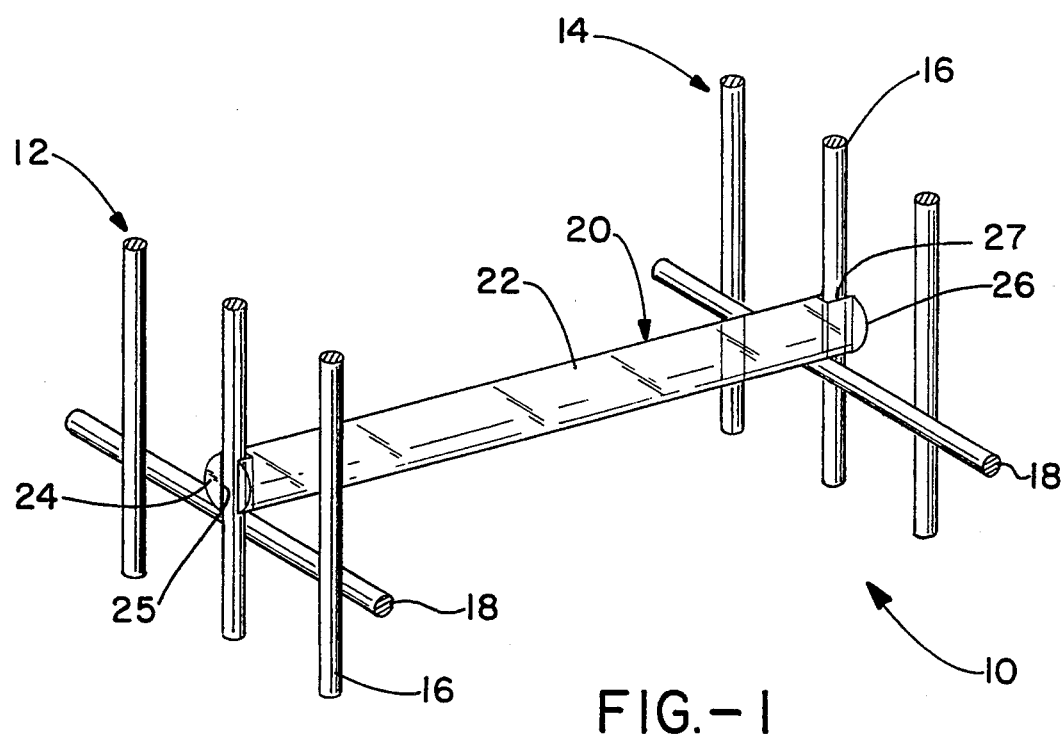
FIG. 1 is a perspective view of the principal embodiment of the present invention as removably attached to the opposing sides of an open wire cage.
Figure 2:
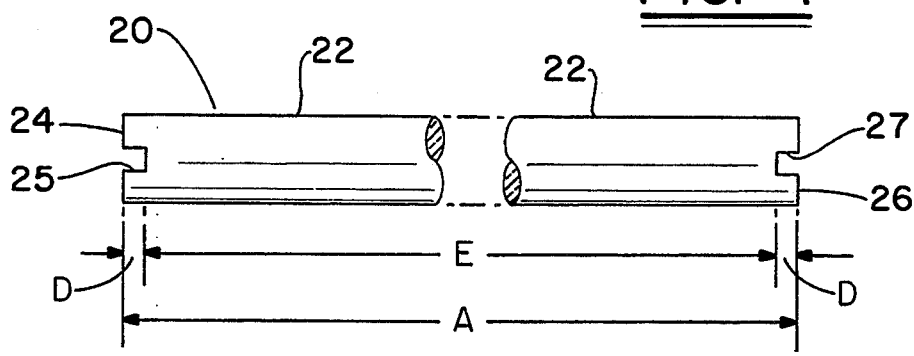
FIG. 2 is a top view of the embodiment of the present invention disclosed in FIG. 1.
Figure 3:
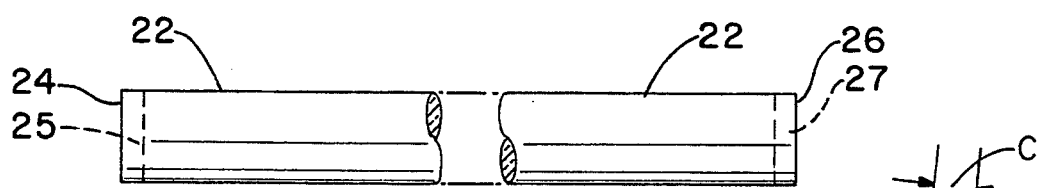
FIG. 3 is a side elevational view of the embodiment of the present invention disclosed in FIGS. 1 and 2.

Now, illustrating the preferred embodiments of the present invention and referring to the accompanying drawings and specifically to FIG. 1, reference numeral 10 refers generally to a conventional avian or animal cage having two (2) sets of opposing walls of which a single set, 12 and 14 is illustrated. Each wall consists essentially of a set of vertically oriented wire or bar elements 16, typically but not necessarily equidistant and of uniform size. One or more horizontal wire or bar elements 18 may also be a part of a cage wall. Such cages and variations of the same are well known in the art. Reference numeral 20 identifies generally the cage cross member of the present invention.

Cross member 20 comprises generally a solid or hollow elongated beam member 22 made of a rigid material such as a plastic, metal, fiberglass or wood. It is preferred, although not required that beam member 22 be capable of withstanding marring from the pecking, chewing or clawing action of caged birds or animals. Additionally, should beam member 22 be susceptible to the marring from these animals, the composition of beam member 22 should be such that it is harmless to the animal or bird.

The currently preferred material from which beam member 22 is composed is acrylic. It has been found that acrylic presents an aesthetically pleasing appearance, is durable and resists marring by the animals or birds.

Beam member 22 is disclosed in FIGS. 1–4 as being cylindrical in shape, although it should be appreciated that its cross-section could be any of numerous shapes including circular, triangular, octagonal, rectangular (see FIG. 9) and the like. The external surface of beam member 22 is smooth, but further embodiments are contemplated as having grooved or textured surfaces.

As further illustrated in FIGS. 1–4, beam member 22 has two terminal ends 24 and 26, each having at least one slot 25 and 27, respectively. Slots 25 and 27 are open at their ends and open to the terminal ends of beam member 22. Slots 25 and 27 correspond in length to diameter "B" of beam member 22. Widths "C" of slots 25 and 27 are preferably just slightly greater than the corresponding diameter of vertical or horizontal bar elements 16, 18 of the corresponding cage 10 so as to engage the same with a friction fit upon installation. However, it is contemplated that in certain cages width "C" of slots 25, 27 may be dimensioned sufficient to contain multiple bar elements. Depth "D" is equal to or greater than the diameter of the corresponding vertical or horizontal bar elements 16, 18.

Length "E" extending from the back wall of slot 25 to the back wall of slot 27 is just slightly shorter than the internal distance between two opposing walls in cage 10. Overall length "A" in the preferred embodiment is approximately equal to the outside distance between two opposing walls of cage 10, although to the extent that "D" is greater than the diameter of a corresponding bar element, beam member 22 may extend beyond the outside dimensions of cage 10.

Figure 4:
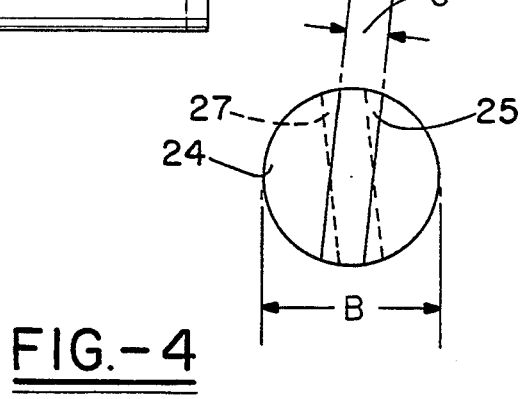
FIG. 4 is an end elevational view of the embodiment of the present invention disclosed in FIGS. 1-3.

As best illustrated in FIG. 4, paired slots 25 and 27 at opposing ends 24 and 26 of beam member 22 are offset from a parallel orientation to one another by a range from about 3°–12°, and more preferably from 5°–8°.

In use and as best illustrated with reference to FIG. 1, but as employed in each embodiment of the present invention, cross member 20 is installed by inserting one or more bar elements 16 or 18 of cage wall 12 into open slot 25 in terminal end 24. Subsequently, beam member 22 is rotated in a direction and manner so as to bring slot 27 in terminal end 26 parallel with corresponding bar element(s) 16, 18 in opposing cage wall 14, whereupon this bar element(s) is inserted into slot 27. This action applies a slight torsion stress to beam member 22 but more significantly applies a strain to the slotted bar elements to the extent that a slight deformation or bending takes place. However, it is the existence of this torsion stress which creates the stability to allow cross member 20 to remain in its designated position without the need for independent mounting device. It is important that the deformation of one or more bar elements not be so great so as to fracture the same or create an opening between adjacent bar elements allowing the caged bird or animal to escape the confines of the cage.

FIGS. 5 and 7 illustrate alternate embodiments of the present invention wherein a cross member 20 contains one or more bores 28 therein allowing for the attachment of one or more accessories, such as transverse perches 34, suspended perches 30, a trapeze, food dispenser or the like, such accessories being well known and attachable to beam member 22 by means known in the art.

Figure 12:
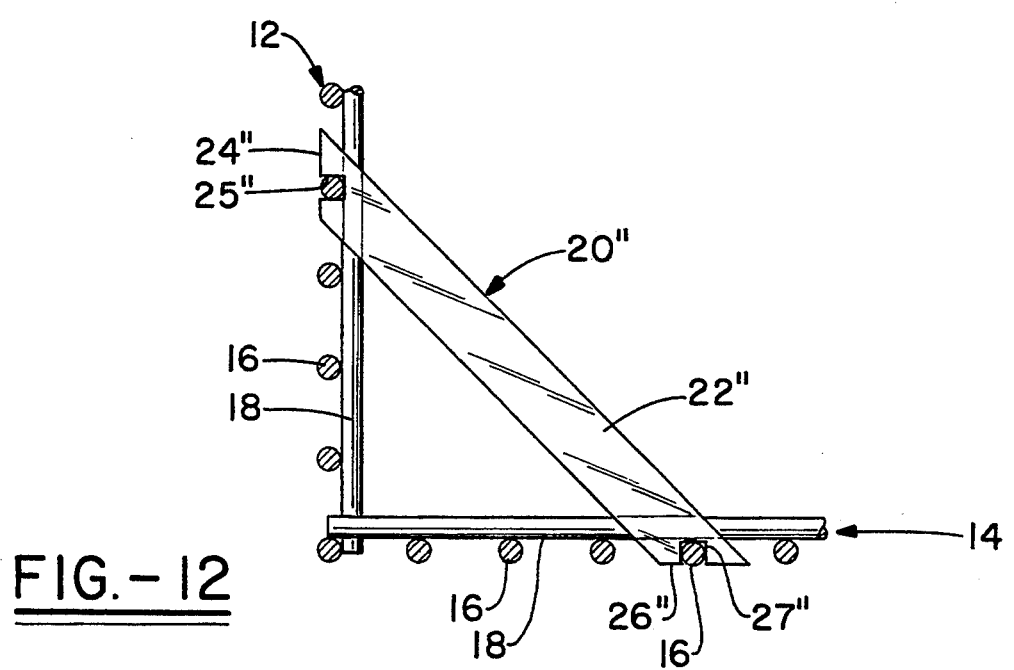
FIG. 12 is a top plan view of a further embodiment of the present invention illustrating attachment to adjacent sides of a cage.

FIGS. 6 and 8 illustrate further embodiments of the present invention in which terminal ends 24' and 26' are angled relative to the longitudinal axis of beam member 22'. When ends 24' and 26' are angled to the longitudinal axis of beam member 22' and in essentially parallel orientation to one another with the slots 25' and 27' running with the angle, an inclined cross member 20' is obtained. Similarly, where the terminal ends are oriented in an essentially perpendicular relationship to one another and the slots are aligned transverse to the created angles, as shown in FIG. 12, it is possible to attach the cross member to bar elements of adjacent rather than opposing sides of a cage 10.

A series of notches 36 formed in beam member 22 are shown in FIG. 8 and serve to create a set of stairs for bird or animal amusement.

Figure 10:
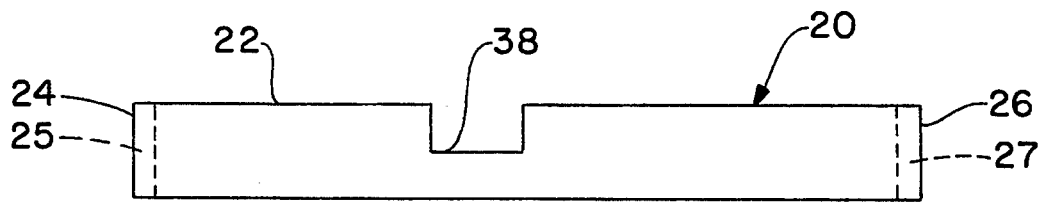
FIG. 10 is a side elevational view of a modification to the embodiment of the present invention disclosed in FIG. 1.
Figure 11:
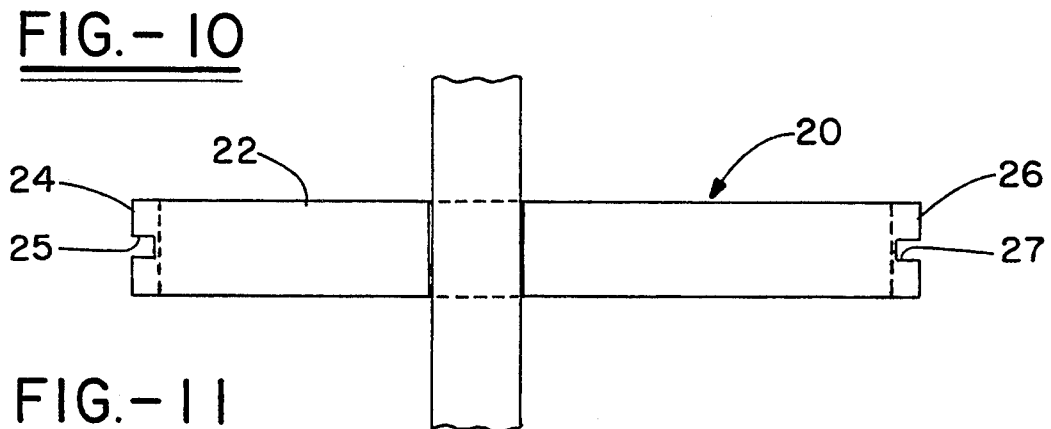
FIG. 11 is a top view of the embodiment of the present invention disclosed in FIG. 10 and further illustrating an additional interlocking cross member.

FIGS. 10 and 11 illustrate the incorporation of additional structural components wherein such components are combined or interlocked with cross member 20 and supported either by cross member 20 or by similar but independent attachment to cage 10.

FIG. 11 further illustrates an embodiment in which either one or both ends 24 and 26 have two or more open slots 25 and 27. FIG. 12 illustrates an embodiment in which the bird or animal cage cross member is attached to adjacent sides of the cage.

While in accordance with the patent statutes, the best mode and preferred embodiment of the invention have been described, it is to be understood that the invention is not limited thereto, but rather is to be measured by the scope and spirit of the appended claims.

What is claimed is:

1. A bird or animal cage cross member comprising:
   a unitary elongated beam member having a first end and a second opposing end, each end having at least one open slot paired with a slot at the opposing end, each said slot extending across said end and being of sufficient dimension for operatively receiving at least one cage support member, each pair of slots being offset of parallel to one another, said cross member being capable of removable attachment to opposing or adjacent sides of said cage by first engaging at least one support member of one side of said cage within a slot, followed by axial rotation of said beam member to engage at least one support member of a second cage side within said paired slot at the opposite end of said beam member wherein said cross member is held with a friction fit.

2. The bird or animal cage cross member as recited in claim 1 wherein said cross member is made of a rigid plastic material.

3. The bird or animal cage cross member as recited in claim 2 wherein said cross member is made of an acrylic material.

4. The bird or animal cage cross member as recited in claim 1 wherein said cross member is cylindrical.

5. The bird or animal cage cross member as recited in claim 1 wherein the ends of said beam member are essentially parallel to one another and angled with respect to the longitudinal axis of said cross member.

6. The bird or animal cage cross member as recited in claim 1 wherein said cross member further comprises one or more notches positioned along the longitudinal axis of said beam member and open to its periphery.

7. The bird or animal cage cross member as recited in claim 1 wherein said cross member further comprises one or more elongated members attached transverse to the longitudinal axis of said beam member.

8. The bird or animal cage cross member as recited in claim 1 wherein said cross member is capable of interlocking with additional cross members.

9. The bird or animal cage cross member as recited in claim 1 wherein each pair of slots are about 3–15 degrees from parallel to one another.

10. The bird or animal cage cross member as recited in claim 9 wherein each pair of slots are about 5 to about 9 degrees from parallel to one another.

11. The bird or animal cage cross member as recited in claim 10 wherein each pair of slots are about 7 degrees from parallel to one another.

12. The bird or animal cage cross member as recited in claim 1 wherein at least one end has two or more open slots.

13. The bird or animal cage cross member as recited in claim 12 wherein two or more open slots intersect with one another.

14. The bird or animal cross member as recited in claim 1 wherein said elongated beam member is hollow.

* * * * *